(No Model.)
L. BELL.
BRINE EVAPORATING APPARATUS.
No. 459,475. Patented Sept. 15, 1891.
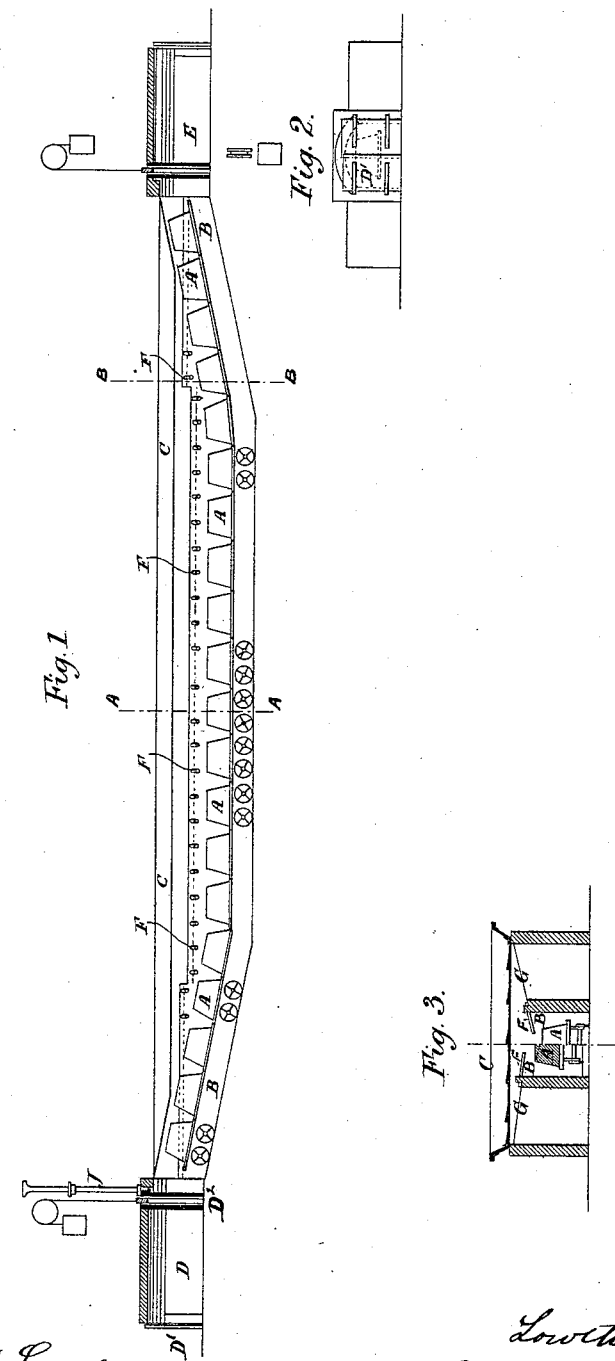
Witnesses.
B. Miller
Baltus D. Long
Inventor.
Lowthian Bell,
By his Attorneys,
Baldwin Davidson & Wright

UNITED STATES PATENT OFFICE.

LOWTHIAN BELL, OF NORTHALLERTON, ENGLAND.

BRINE-EVAPORATING APPARATUS.

SPECIFICATION forming part of Letters Patent No. 459,475, dated September 15, 1891.

Application filed May 15, 1889. Serial No. 310,847. (No model.) Patented in England December 1, 1888, No. 17,564; in France May 7, 1889, No. 198,005, and in Germany May 10, 1889, No. 50,422.

*To all whom it may concern:*

Be it known that I, LOWTHIAN BELL, a subject of the Queen of Great Britain, residing at Rounton Grange, Northallerton, in the county of York, England, have invented certain new and useful Improvements in Brine-Evaporating Apparatus, (for which I have received Letters Patent in the following countries, viz: Great Britain, No. 17,564, dated December 1, 1888; France, No. 198,005, dated May 7, 1889, and Germany, No. 50,422, dated May 10, 1889,) of which the following is a specification.

My invention relates to that class of apparatus in which the brine is evaporated by the application of artificial heat to open pans containing the solution to be evaporated.

The object of my invention is to utilize the waste heat of hot slag resulting from metallurgical operations, which end I attain by certain novel organizations of instrumentalities hereinafter specified. Such instrumentalities, unless otherwise indicated, are of usual approved construction.

In order to carry out my invention, I run the hot slag directly from a furnace into iron vessels mounted on wheels and capable of containing several tons of slag, and pass them down an incline into a chamber, passage, or tunnel, over which an evaporating-pan of large area is set. Water is then sprinkled over the slag to harden its exterior and to generate steam, which imparts its heat to the bottom of the pan and to its contents. The chamber, passage, or tunnel also contains water in which the slag or the vessels containing it as they progress slowly down the incline are immersed, thus keeping the water at a boiling heat and utilizing the escaping steam to heat the evaporating-pan. The operation is continued by withdrawing the cooled slag and continually substituting hot slag. In place of using water, a current of air may be forced over the slag and then caused to circulate around or beneath the pans to heat them, the air being led back again to the exit and so as to cause a continuous circulation of the hot air and economize heat.

In the accompanying drawings, which show so much only of the apparatus as is necessary to illustrate the subject-matter claimed, Figure 1 represents a vertical longitudinal section therethrough; Fig. 2 an end elevation, and Fig. 3 two half-transverse sections on the lines A A and B B, respectively, of Fig. 1.

Fig. 1 shows the slag-containing vessels as mounted on a train of connected trucks A, adapted to travel on suitable rails or ways in a chamber or tunnel covered by an evaporating-pan C. The tunnel is shown as consisting mainly of four longitudinal parallel walls, the outer ones being somewhat higher than the inner ones. The evaporating-pan rests on these outer walls. The inner walls B are just far enough apart to allow the trucks freely to traverse the space between them, so as to diminish the area to be heated. The tunnel is also inclined downward from each end toward the center, which constitutes a pit or receptacle containing water, in which the slag is immersed as it passes through the tunnel. The trucks enter and leave the tunnel through lock-chambers D E. The entrance-chamber D is provided with folding entrance-doors D' at its outer end and with a counterbalanced door D² fitting closely in vertical ways in the chamber, so as to prevent the entrance of air or the escape of steam beyond that incident to the temporary opening and closing of the doors. The exit-chamber E is correspondingly constructed. The sliding door D² is normally kept closed, the entrance-doors D' are opened as occasion requires, and the slag-trucks successively shoved into the lock-chamber. These outer doors are then closed, the sliding door opened, the truck shoved into the tunnel, and the sliding door closed behind it. The folding doors may then be opened for the admission of another truck. The trucks may be shoved into the tunnel by a locomotive, or may be connected together so as to be pulled out by a rope or chain actuated in any suitable manner, or they may be moved by a bar poked in through a hole in the door, all these being well-known workshop expedients.

Fig. 3 shows inclined roofs G, which slope downward underneath the pan from its outer edges toward the center, covering the space on each side between the outer and inner side walls, to catch the water of condensation which drips from the pan and discharge it through a series of nozzles F upon the slag. These roofs also serve to diminish the space to be heated by excluding steam from the spaces between the longitudinal walls on each side of the passage traversed by the trucks. An ordinary circulating-pump (not shown in the drawings) may be employed for raising the water from the bottom of the tunnel to supply these nozzles, the tunnel being supplied in ordinary ways. The chimney J is only employed when air is used as a heating medium instead of water.

In operation the trucks pass successively down the incline to the central receptacle or water-pit, the water in which normally stands at about the level of the top of the slag-containing vessel. This immersion of the heated slag rapidly raises the water to the boiling-point and generates steam, which comes in contact with the bottom of the evaporating-pan, quickly imparting its heat thereto and evaporating its volatile contents. The cooled slag-trucks are successively shoved out of the tunnel.

I am aware that it has been proposed to sprinkle water on hot slag to generate steam for operating machinery in metallurgical operations, and do not, therefore, broadly claim such apparatus.

The process herein described constitutes the subject-matter of another application filed by me simultaneously herewith, Serial No. 310,848.

Having thus fully described the construction, organization, and operation of my improved brine-evaporating apparatus, what I claim therein as new and as of my own invention is—

1. The combination, substantially as hereinbefore set forth, of a chamber, passage, or tunnel having four parallel longitudinal walls, an evaporating-pan covering them, and hot-slag trucks adapted to traverse the central portion of the tunnel between its inner walls.

2. The combination, substantially as hereinbefore set forth, of an evaporating-pan, a chamber, passage, or tunnel thereunder, lock-chambers connected with the tunnel, and hot-slag trucks adapted to traverse the tunnel and lock-chambers.

3. The combination, substantially as hereinbefore set forth, of an evaporating-pan, a chamber, passage, or tunnel thereunder, hot-slag trucks traversing the tunnel, and nozzles in the latter for sprinkling the slag.

4. The combination, substantially as hereinbefore set forth, of an evaporating-pan, a chamber, passage, or tunnel thereunder having a central depression or water-pit, and hot-slag trucks traversing said pit.

5. The combination, substantially as hereinbefore set forth, of an evaporating-pan, a chamber, passage, or tunnel thereunder having a central depression or water-pit, hot-slag trucks traversing the tunnel, and sprinkling-nozzles in the latter.

6. The combination, substantially as hereinbefore set forth, of an evaporating-pan, a chamber, passage, or tunnel thereunder, hot-slag trucks traversing the tunnel, lock-chambers connected with the tunnel, and sprinkling-nozzles therein.

7. The combination, substantially as hereinbefore set forth, of an evaporating-pan, a chamber, passage, or tunnel thereunder having a central depression or water-pit, hot-slag trucks traversing the tunnel, lock-chambers connected therewith, and sprinkling-nozzles therein.

8. The combination, substantially as hereinbefore set forth, of a tunnel composed of four parallel walls, an evaporating-pan covering these walls, lock-chambers connected with the central portion of the tunnel, their entrance and exit doors, and hot-slag trucks adapted to traverse the lock-chambers and tunnel.

9. The combination, substantially as hereinbefore set forth, of an evaporating-pan, a chamber, passage, or tunnel thereunder, hot-slag trucks traversing the tunnel, inwardly-inclined roofs resting on the tunnel-walls under the pan to receive the water of condensation, and sprinkling-nozzles to discharge this water upon the hot slag.

10. The combination, substantially as hereinbefore set forth, of an evaporating-pan, a chamber, passage, or tunnel thereunder having a central depression or water-receptacle, hot-slag trucks traversing the tunnel, lock-chambers connected with the tunnel, their entrance and exit doors, inwardly-inclined roofs under the evaporating-pan, and sprinkling-nozzles to conduct the water of condensation from the pan upon the slag.

LOWTHIAN BELL.

Witnesses:
HUGH BELL,
*Red Barns, Coatham, Redcar, Yorkshire, England, Ironmaster.*
C. SIMPSON SMITH,
*13 Grange Road West, Middlesbrough, England, Accountant.*